(12) United States Patent
Kim et al.

(10) Patent No.: US 10,554,919 B2
(45) Date of Patent: Feb. 4, 2020

(54) IMAGE SENSOR FOR EXTRACTING EDGE INFORMATION

(71) Applicant: Korea University Research and Business Foundation, Seoul (KR)

(72) Inventors: Yong Sin Kim, Seoul (KR); Jeong Seok Kim, Seoul (KR)

(73) Assignee: KOREA UNIVERSITY RESEARCH AND BUSINESS FOUNDATION, Seoul (KR)

(*) Notice: Subject to any disclaimer, the term of this patent is extended or adjusted under 35 U.S.C. 154(b) by 167 days.

(21) Appl. No.: 15/147,994

(22) Filed: May 6, 2016

(65) Prior Publication Data

US 2016/0330393 A1    Nov. 10, 2016

(30) Foreign Application Priority Data

May 7, 2015    (KR) .......................... 10-2015-0063957

(51) Int. Cl.
*H04N 5/378*    (2011.01)
*H04N 5/369*    (2011.01)
*H04N 5/374*    (2011.01)
*H04N 5/33*    (2006.01)

(52) U.S. Cl.
CPC .................................. *H04N 5/378* (2013.01)

(58) Field of Classification Search
None
See application file for complete search history.

(56) References Cited

U.S. PATENT DOCUMENTS

| | | | | |
|---|---|---|---|---|
| 5,825,940 A * | 10/1998 | Yamagata | ............ | H04N 1/4051 382/276 |
| 2003/0193595 A1* | 10/2003 | Henderson | ............. | H04N 5/363 348/308 |
| 2005/0219411 A1* | 10/2005 | Chang | .................... | H04N 7/012 348/452 |
| 2005/0238250 A1* | 10/2005 | Jo | .......................... | H04N 5/367 382/275 |
| 2005/0280714 A1* | 12/2005 | Freeman | ................. | H04N 5/349 348/219.1 |
| 2008/0128698 A1* | 6/2008 | Martin | ................. | G03F 7/70433 257/55 |
| 2008/0129841 A1* | 6/2008 | Dosluoglu | ............. | H04N 5/335 348/231.99 |
| 2009/0231479 A1* | 9/2009 | Zarnowski | ............ | H03M 1/123 348/302 |

(Continued)

FOREIGN PATENT DOCUMENTS

| | | |
|---|---|---|
| JP | 2008032427 A | 2/2008 |
| JP | 2009017583 A | 1/2009 |
| KR | 101180387 B1 | 9/2012 |

*Primary Examiner* — Mohammad J Rahman
(74) *Attorney, Agent, or Firm* — Hauptman Ham, LLP (57) ABSTRACT

An image sensor is disclosed. The image sensor includes: a pixel array comprising a plurality of pixels that convert an optical image signal incident from a subject into electrical image data; a driver configured to output a plurality of control signals for controlling the plurality of pixels; a comparison unit configured to compare pieces of data output from two adjacent pixels and output the comparison result; and a buffer configured to receive output signals output from the comparison unit and output frame data.

6 Claims, 6 Drawing Sheets

(56) References Cited

U.S. PATENT DOCUMENTS

| | | | |
|---|---|---|---|
| 2009/0244335 A1* | 10/2009 | Chou | H04N 5/2173 348/294 |
| 2011/0221938 A1* | 9/2011 | Leung | H04N 5/3575 348/243 |
| 2011/0268318 A1* | 11/2011 | Kim | H04N 5/369 382/103 |
| 2012/0140089 A1* | 6/2012 | Koh | H04N 5/23245 348/220.1 |
| 2012/0228506 A1* | 9/2012 | Honda | G01J 5/20 250/338.4 |
| 2013/0169819 A1* | 7/2013 | Strandemar | H04N 5/23248 348/164 |
| 2013/0229543 A1* | 9/2013 | Hashimoto | H04N 5/35545 348/222.1 |
| 2014/0028883 A1* | 1/2014 | Shin | G01S 17/89 348/297 |
| 2014/0070074 A1* | 3/2014 | Tachibana | H01L 27/14601 250/208.1 |
| 2014/0192163 A1* | 7/2014 | Shimizu | H04N 5/23212 348/46 |
| 2014/0267653 A1* | 9/2014 | Richardson | H04N 5/357 348/65 |
| 2014/0368706 A1* | 12/2014 | Park | H03G 3/001 348/301 |
| 2015/0049230 A1* | 2/2015 | Lee | H01L 27/1461 348/308 |
| 2015/0102206 A1* | 4/2015 | Borremans | H04N 5/243 250/208.1 |
| 2015/0115163 A1* | 4/2015 | Nishihara | H04N 5/32 250/366 |
| 2015/0162925 A1* | 6/2015 | Lee | H03M 1/1295 250/208.1 |
| 2015/0195469 A1* | 7/2015 | Kim | H04N 5/374 348/308 |

* cited by examiner

| 0 | 0 | 0 | 0 | 0 | 0 | 0 |
|---|---|---|---|---|---|---|
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |
| 0 | 0 | 0 | 0 | 0 | 0 | 0 |

IMAGE SENSOR FOR EXTRACTING EDGE INFORMATION

CROSS-REFERENCE TO RELATED APPLICATIONS

A claim for priority under 35 U.S.C. § 119 is made to Korean Patent Application No. 10-2015-0063957 filed May 7, 2015, in the Korean Intellectual Property Office. The entire contents of this application are hereby incorporated by reference.

BACKGROUND

Statement of the Technical Field

The present document relates to an image sensor, and more particularly, the present document relates to an image sensor for extraction of edge information that outputs frame data without analog-to-digital conversion.

Description of the Related Art

In a conventional image sensor, a plurality of pixels that are included in a pixel array are accessed in units of columns or in units of rows to extract image data. Furthermore, the conventional image sensor for edge extraction includes a pixel array that includes a plurality of pixels, a row driving unit that drives a row of the pixel array in response to a row address, an analog-to-digital conversion unit that converts analog pixel data of the selected row into digital pixel data, and an addressable buffer memory that receives the digital pixel data from the analog-to-digital conversion unit and outputs pixel data in response to a column address.

The image sensor may be efficient when data extracted from the image sensor is displayed without modification. However, the image sensor may be inefficient in that signal values of adjacent pixels are compared with each other to extract edge information. That is, since a lot of devices and operations are necessary as far as a structure of the image sensor is used, the image sensor consumes a lot of power and a response time is great.

SUMMARY

The present disclosure concerns an image sensor that extracts edge information easily without analog-to-digital conversion and outputs frame data.

In some scenarios, there is provided an image sensor that includes: a pixel array including a plurality of pixels that convert an optical image signal incident from a subject into electrical image data; a driver configured to output a plurality of control signals for controlling the plurality of pixels; a comparison unit configured to compare pieces of data output from two adjacent pixels and output the comparison result; and a buffer configured to receive output signals of comparison unit and output frame data.

BRIEF DESCRIPTION OF THE FIGURES

The above and other objects and features will become apparent from the following description with reference to the following figures, wherein like reference numerals refer to like parts throughout the various figures unless otherwise specified.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

Figure 1:
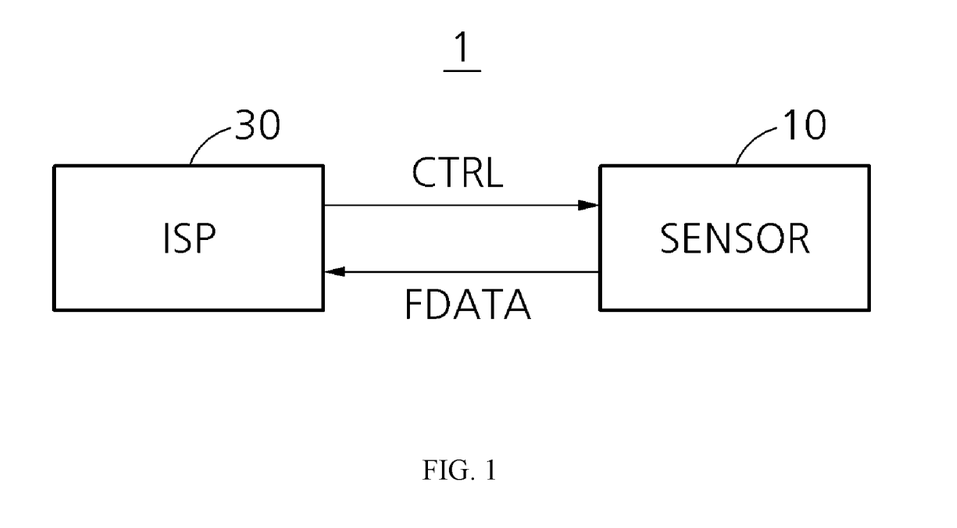
FIG. 1 is a block diagram of an image processing system.

FIG. 1 is a block diagram of an image processing system.

Referring to FIG. 1, an image processing system 1 that may be called an "edge information extraction system" includes an image sensor 10 and an image signal processor 30.

The image sensor 10, for example, a complementary metal oxide semiconductor (CMOS) image sensor may convert an optical image signal incident from a subject into an electrical image signal (or electrical image data) and output the electrical image signal, that is, frame data FDATA.

Also, the image sensor 10 may generate the frame data FDATA in response to a control signal CTRL output from the image signal processor 30 and output the generated frame data FDATA.

The image signal processor 30 may receive the frame data FDATA and extract edge information from the frame data FDATA.

In some scenarios, the image signal processor 30 and the image sensor 10 may be packed in one package, for example, a multi-chip package.

The image processing system 1 may be implemented with an electronic device such as a digital camera, a digital single-lens reflex (DSLR) camera a mobile phone, a smart phone, a tablet computer, or a handheld device. Furthermore, the image processing system 1 may be implemented with a wearable device such as a smart watch or a smart glass.

Figure 2:
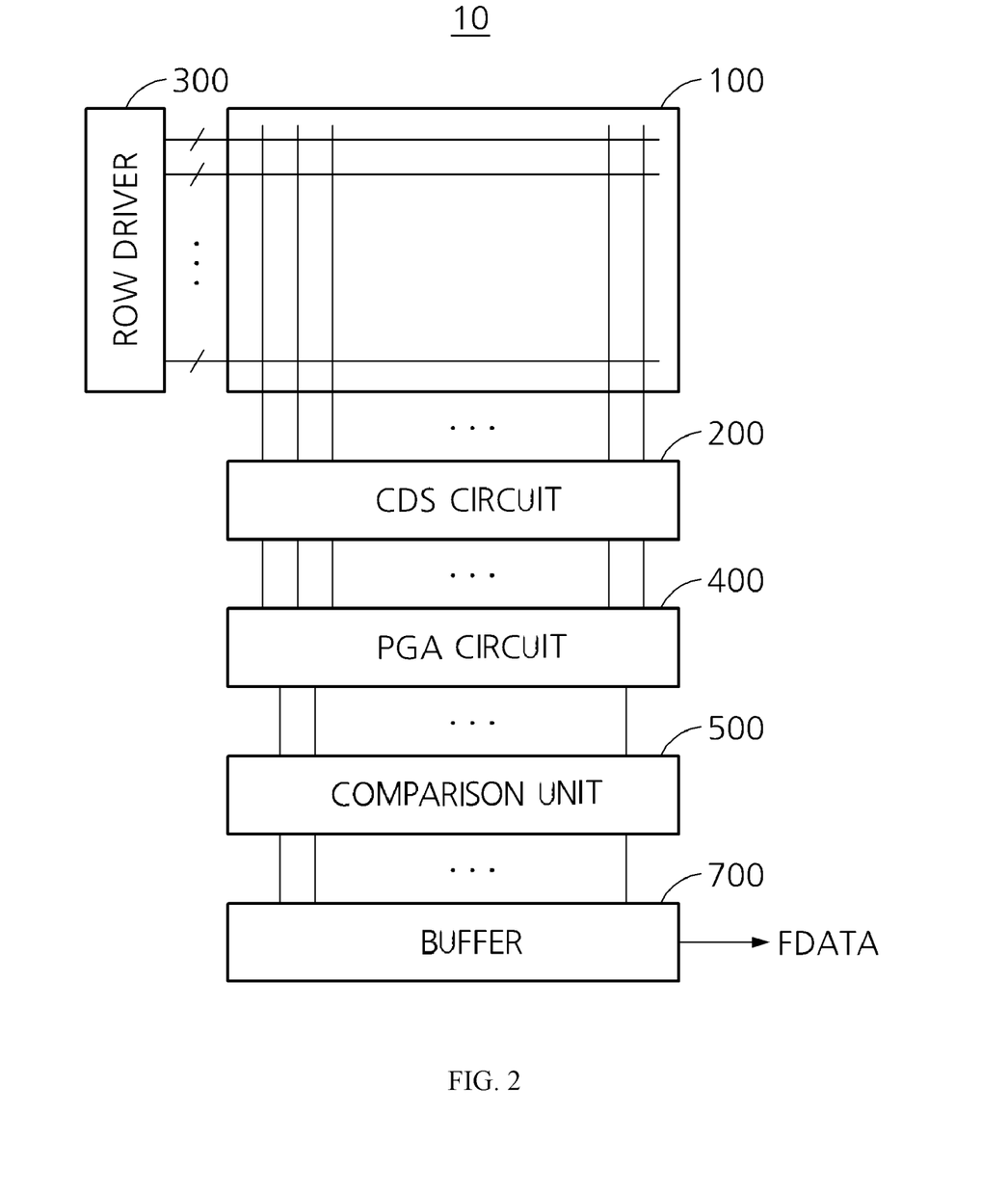
FIG. 2 is a function block diagram of an image sensor illustrated in FIG. 1.

FIG. 2 is a function block diagram of an image sensor illustrated in FIG. 1.

Referring to FIGS. 1 and 2, the image sensor 10 includes a pixel array 100, a row driver 300, a comparison unit 500, and a buffer 700. In some scenarios, the image sensor 10 may further include a correlated double sampling (CDS) circuit 200 and/or a programmable gain amplifier (PGA) circuit 400.

The pixel array 100 includes a plurality of pixels arranged in a matrix form. Each of the plurality of pixels may convert light of a specific spectrum into an electrical signal. The specific spectrum may include, but is not limited to, infrared bands.

Although not illustrated in FIG. 2, the row decoder 300 may generate a plurality of control signals for controlling a photo-sensing operation of each of the plurality of pixels under control of a timing generator included in the image sensor 10. The row driver 300 may drive pixels in units of rows.

The CDS circuit 200 may perform a correlate double sampling operation with respect to an analog pixel signal from the pixel array 100. Offsets among pixels may be removed by the correlate double sampling operation of the CDS circuit 200.

The PGA circuit 400 may amplify a signal sampled by the CDS circuit 200 with a gain defined in advance. A signal-to-noise ratio may be improved by the PGA circuit 400.

The comparison unit 500 may include a plurality of comparators, and two column data lines that are adjacent to each other may be connected to input terminals of each of the plurality of comparators. The comparison unit 500 may compare pieces of data of two adjacent pixels and output the comparison result. In some scenarios, output lines of the CDS circuit 200 or output lines of the PGA circuit 400 may be connected to input terminals of the plurality of comparators, and the comparison unit 500 may output a result of comparing pieces of data of two adjacent pixels.

The buffer 700 temporarily stores a digital signal output from the comparison unit 500 and then amplifies and output the digital signal.

The timing generator may output control signals for controlling operations of the elements 300, 200, 400, 500, and 700.

Also, the image sensor 10 may further include a light source that radiates light of a specific wavelength to a subject. The light source may be implemented with a light emitting diode that radiates light having wavelengths of an infrared band.

Figure 3:
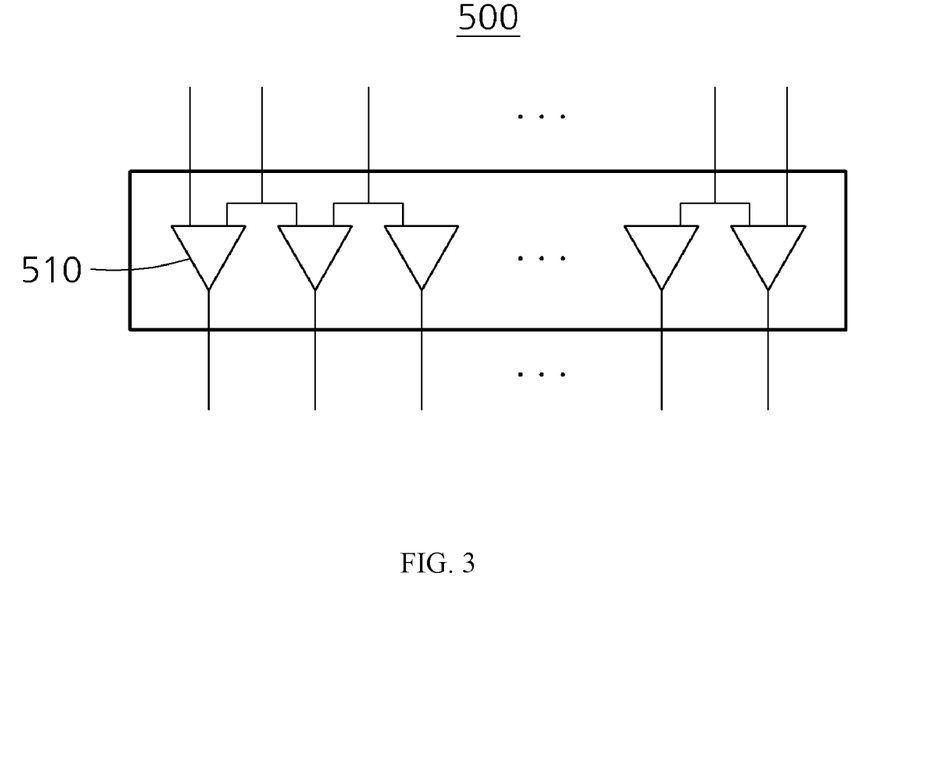
FIG. 3 is a drawing illustrating a comparison unit illustrated in FIG. 2.

FIG. 3 is a drawing illustrating a comparison unit illustrated in FIG. 2. Referring to FIGS. 1 to 3, the comparison unit 500 includes a plurality of comparators 510.

Two adjacent column data lines are connected with input terminals of each of the plurality of comparators 510. The comparator 510 may compare pieces of data of two adjacent pixels and output the comparison result. In the case where the image sensor 10 includes the CDS circuit 200, the output lines of the CDS circuit 200 may be connected to the input terminals of the plurality of comparators 510. In the case where the image sensor 10 includes the PGA circuit 400, the output lines of the PGA circuit 400 may be connected to the input terminals of the plurality of comparators 510.

In this case, each of the plurality of comparators 510 may output one of "0" and "1" when pieces of data of two adjacent pixels are the same. In contrast, each of the plurality of comparators 510 may output the other of "0" and "1" when pieces of data of two adjacent pixels are different from each other.

In some scenarios, each comparator 510 may output one of "0" and "1" when a difference between pieces of data of two adjacent pixels is less than a value defined in advance and may output the other of "0" and "1" when a difference between pieces of data of two adjacent pixels is greater than the value.

Figure 4:
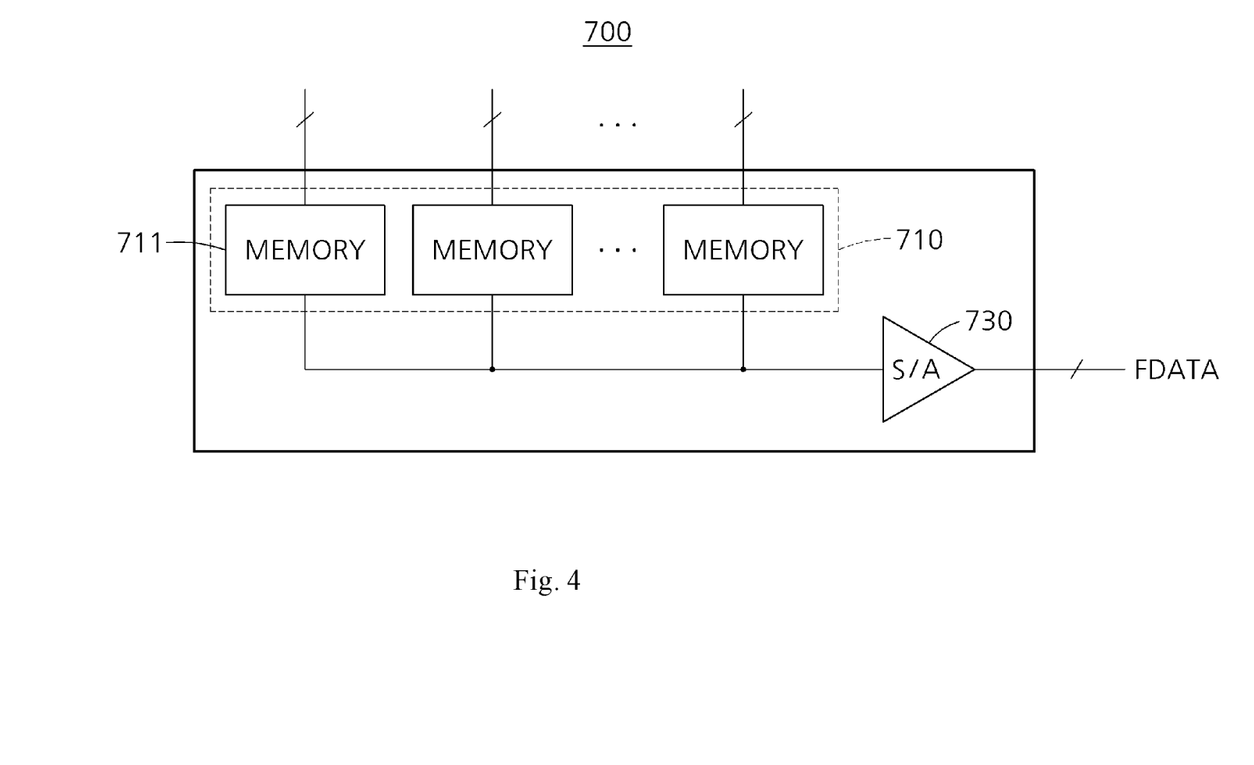
FIG. 4 is a drawing illustrating a buffer illustrated in FIG. 2.

FIG. 4 is a drawing illustrating a buffer illustrated in FIG. 2. Referring to FIGS. 1 to 4, the buffer 700 includes a column memory block 710 and a sense amplifier 730, and the column memory block 710 includes a plurality of memories 711.

Each of the plurality of memories 711 may operate in response to a memory control signal that a memory controller located inside the timing generator or inside the column memory block 710 generates based on a control signal generated by the timing generator. Each of the plurality of memories 711 may be implemented with a static random access memory (SRAM).

The column memory block 710 temporarily stores digital signals respectively output from the plurality of comparators 510 in response to the memory control signal and then output the digital signals. The sense amplifier 730 may sense and amplify the digital signals and output the sensed and amplified digital signals. In this case, the digital signals may be output as the frame data FDATA.

Figure 5A:
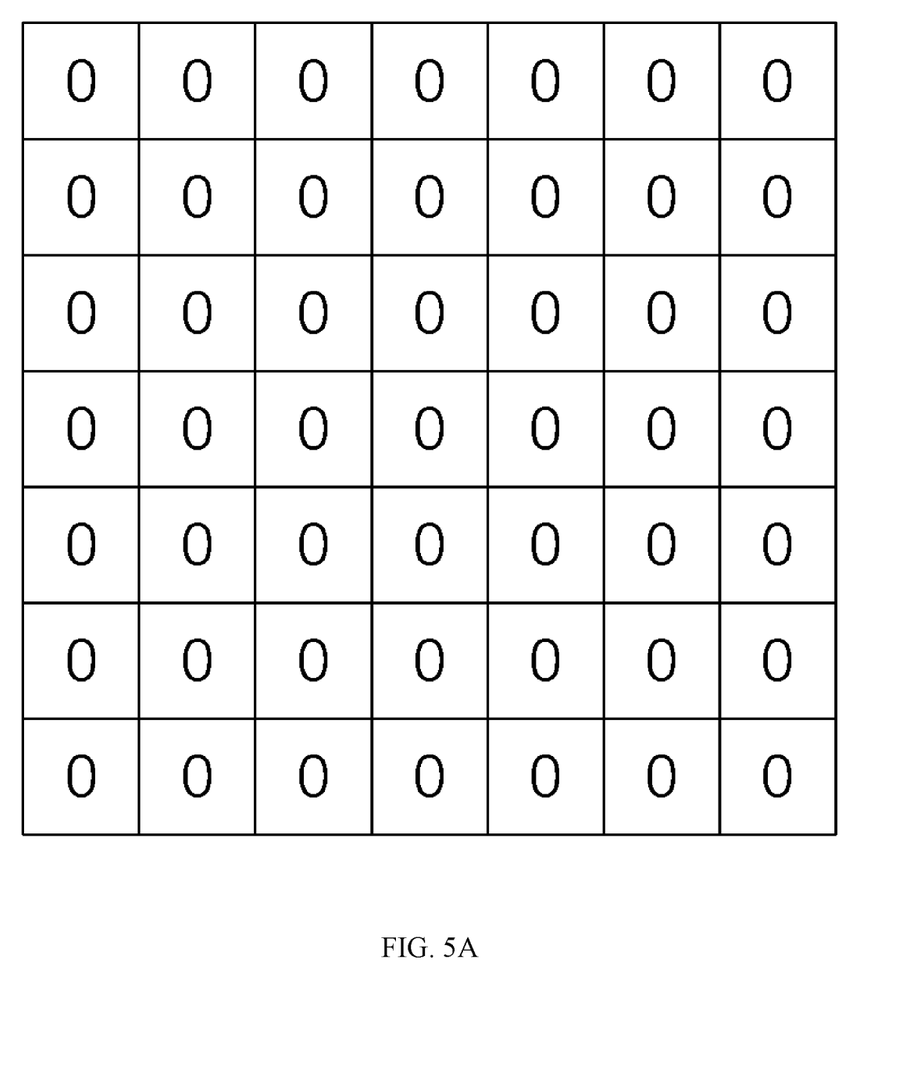
FIGS. 5A and 5B are drawings illustrating frame examples of data output from an image sensor illustrated in FIG. 1.
Figure 5B:
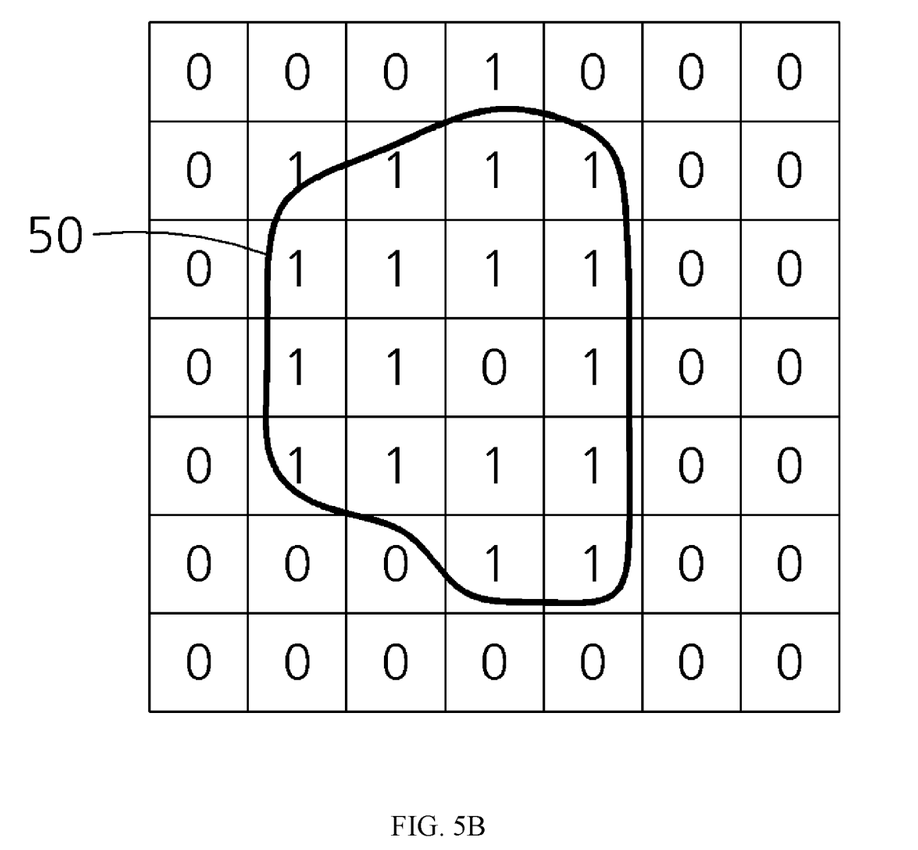

FIGS. 5A and 5B are drawings illustrating frame examples of data output from an image sensor illustrated in FIG. 1.

Referring to FIG. 5A, values of all pixel data included in frame data may be "0". The frame data may be data that is generated when adjacent pixels have the same or similar values. Accordingly, no edge may be extracted from the frame data.

Referring to FIG. 5B, values of all pixel data included in frame data may be composed of 1s and 0s. Since pixel data is "1" when adjacent pixels have different values or when a difference between adjacent pixel values leaves a range defined in advance, the image signal processor 30 may extract an edge 50 by using a predetermined algorithm.

The image sensor 10 described with reference to FIGS. 1 to 5 includes the row decoder 300 that selects a plurality of pixels included in the pixel array in units of rows, and the pixel array 100 outputs pixel data in units of rows.

However, the inventive concept is not limited thereto. For example, the image sensor 10 may include a column driver that selects a plurality of pixels included in the pixel array 100 in units of columns, and the pixel array may output pixel data in units of columns.

An image sensor (in some scenarios) may not include an analog-to-digital converter and may be implemented with one light source. Accordingly, it may be possible to markedly reduce power consumption of the image sensor and to improve a response speed.

An image sensor (in some scenarios) may generate frame data from which edge information is easily extracted without analog-to-digital conversion.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An image sensor comprising:
 a pixel array comprising a plurality of pixels arranged in a matrix form and configured to convert an optical image signal incident from a subject into pixel signals comprising electrical image data;
 a row driver coupled to the pixel array and configured to output a plurality of control signals for controlling the plurality of pixels in the pixel array;
 a plurality of column lines coupled to the pixel array, wherein each of the plurality of column lines is connected to pixels arranged in corresponding column line of the pixel array;
 a correlated double sampling circuit coupled to, through the plurality of column lines, an output of the pixel array, configured to perform a correlated double sampling operation with respect to the pixel signals output from the pixel array through the plurality of column lines in order to remove offset among the pixel array, and configured to output sampled electrical image data through a plurality of column data lines as output lines of the correlated double sampling circuit;

a comparison unit comprising a plurality of comparators coupled to the correlated double sampling circuit, through the plurality of column data lines, wherein each comparator of the plurality of comparators is connected with two adjacent column data lines of the plurality of column data lines so that the comparison unit is configured to compare pieces of the sampled electrical image data corresponding to the electrical image data output from two adjacent pixels arranged in two adjacent column lines of the pixel array, and output result signals, where each of said result signals specifies a respective comparison result value comprising a "0" or a "1" selected based on whether an amount of difference between the pieces of the sampled electrical image data exceeds or falls below a pre-defined value;

a buffer coupled to an output of the comparison unit, configured to receive the result signals output from the comparison unit, and configured to output the result signals as frame data; and an image signal processor coupled to the buffer and configured to extract edge information from the frame data based on the "0" and "1" values contained in the frame data.

2. The image sensor of claim 1, further comprising:
a light source that radiates light having wavelengths of an infrared band to the subject, wherein each of the plurality of pixels converts the light having the wavelengths of the infrared band into electrical image data.

3. The image sensor of claim 1, wherein the driver is a row driver configured to select the plurality of pixels in units of rows.

4. The image sensor of claim 1, wherein the driver is a column driver configured to select the plurality of pixels in units of columns.

5. The image sensor of claim 1, wherein the comparison unit outputs one of "1" and "0" when pieces of data of the two adjacent pixels are the same and outputs the other of "1" and "0" when the pieces of data of the two adjacent pixels are different from each other.

6. The image sensor of claim 1, wherein the comparison unit outputs one of "1" and "0" when a difference between pieces of data of the two adjacent pixels exists in a range and outputs the other of "1" and "0" when the difference leaves the range.

* * * * *